United States Patent [19]
van der Tol

[11] Patent Number: 5,257,330
[45] Date of Patent: Oct. 26, 1993

[54] POLARIZATION FILTER WITH INTERMEDIATE OPTICAL WAVEGUIDE WHICH IS MONOMODAL FOR ONE POLARIZATION AND BIMODAL FOR THE OTHER

[75] Inventor: Johannes J. G. M. van der Tol, Zoetermeer, Netherlands

[73] Assignee: Koninklijke PTT Nederland N.V., Groningen, Netherlands

[21] Appl. No.: 907,149

[22] Filed: Jul. 1, 1992

[30] Foreign Application Priority Data

Jul. 11, 1991 [NL] Netherlands ............... 9101226

[51] Int. Cl.$^5$ ............... G02B 6/12; G02B 6/26
[52] U.S. Cl. ............... 385/11; 385/14; 385/42; 385/50
[58] Field of Search ............... 385/9, 11, 28, 29, 30, 385/31, 42, 43, 129, 50, 14

[56] References Cited

U.S. PATENT DOCUMENTS

| | | | |
|---|---|---|---|
| 3,920,314 | 11/1975 | Yajima | 385/28 |
| 4,669,815 | 6/1987 | Thaniyavarn | 385/50 |
| 4,789,212 | 12/1988 | Bristow et al. | 385/14 |
| 4,998,793 | 3/1991 | Henry et al. | 385/15 |
| 5,016,959 | 5/1991 | Diemeer | 385/16 |
| 5,082,341 | 1/1992 | Walker | 385/42 |

FOREIGN PATENT DOCUMENTS

| | | |
|---|---|---|
| 0290061A1 | 11/1988 | European Pat. Off. . |
| 0344857A1 | 12/1989 | European Pat. Off. . |
| 3801272A1 | 7/1989 | Fed. Rep. of Germany . |

OTHER PUBLICATIONS

H. G. Unger, "Planar Optical Waveguides and Fibres", 1977, pp. 196–199, 214–215, 224–227, Oxford University Press.
Y. Suzuki et al, "Polarization Mode Filter in GaAs-AlAs Superlattice Fabricated by SiO$_2$ Cap Disordering", Nov. 1990, pp. 818–819, IEEE Photonics Technology Letters vol. 2, No. 11.
Y. Suzuki et al, "Polarization Mode Selective Channel Waveguides in an InGaAs/InP Disordered Superlattice", Oct. 22, 1990, pp. 2745–2747, 1990 American Institute of Physics.
William K. Burns et al, "Mode Conversion in Planar--Dielectric Separating Waveguides", Jan. 1975, pp. 32–39, IEEE Journal of Quantum Electronics, vol. QE-11, No. 1.
Y. Shani et al, "Integrated Optic Adiabatic Devices on Silicon", Mar. 1991, pp. 556–566, No. 3.

*Primary Examiner*—Frank Gonzalez
*Attorney, Agent, or Firm*—Frishauf, Holtz, Goodman & Woodward

[57] ABSTRACT

Polarization filter for delivering an output signal So containing only one (TE or TM) of the two polarizations (TE and TM) in an input signal Si, comprising an intermediate guide section (5) between an input section (A) and an output section (B). The output section (B) is a mode splitter having a monomodal output channel (3) for the output signal ($S_o$) and a monomodal dummy channel (4) which recedes beyond the interaction distance (D). The output channel (3) has a lower propagation constant than the dummy channel (4). The input section (A) having an input channel (1) and a dummy channel (2) is an inverse mode splitter which may be the mirror image of the output section (B). The guide section (5) is monomodal for one of the two polarizations and bimodal for the other polarization. Both polarizations of the input signal S$_i$ entering via the input channel (1) are initially converted into first-order modes, of which only one is a guided mode of that conductor section and reaches the output section, where it propagates further along the channel having the lowest propagation constant. The first-order mode of the other polarization escapes (6).

6 Claims, 3 Drawing Sheets

POLARIZATION FILTER WITH INTERMEDIATE OPTICAL WAVEGUIDE WHICH IS MONOMODAL FOR ONE POLARIZATION AND BIMODAL FOR THE OTHER

BACKGROUND OF THE INVENTION

1. Field of the Invention

The invention is in the field of integrated optics. More particularly, it relates to a polarization filter for cleaning up an optical signal entering via a monomodal input channel and containing both the TE and the TM polarization modes to produce an optical signal emerging via a monomodal output channel and exclusively containing, at least essentially, one of the two polarization modes.

2. Prior Art

Since waveguides are formed at the surface of a substrate in integrated optics, integrated optical components are in general polarization-sensitive. This sensitivity is a consequence of the fact that the polarization for which the dominant electric field component of the optical signal is perpendicular to the surface, i.e. the TM polarization, experiences a different propagation from the polarization for which the dominant electric field component is parallel to the surface, i.e. the TE polarization. Since an optimum design of a component can generally be produced only for one of the polarizations, the presence of the other polarization is therefore troublesome. Polarization filters are known which filter off this troublesome polarization. Thus, reference [1] (see under C.) discloses a filter in which the TM polarization in the optical signal in a waveguide is suppressed with the aid of a metal layer placed above the waveguide. Although this known principle is in fact simple, it has the drawback that it cannot be applied to the suppression of the TE polarization. In addition, the use of metallized elements in an integrated optical design requires additional measures to prevent interfering action on surrounding component parts. References [2] and [3] furthermore disclose TE and TM filters, on GaAs and InP respectively, in which complicated layer packets ("superlattice") are used to achieve selective suppression of one of the two polarizations, it being possible to reinforce the degree of suppression by combination with a bend structure. A drawback of these TE and TM filters is that their fabrication is expensive owing to the complicated structure. In addition, the suppression achieved (14 dB has been reported) is limited.

SUMMARY OF THE INVENTION

The object of the invention is to overcome the drawbacks outlined above. In this connection, it makes use of the fact it is possible, albeit depending on the material and, in the case of crystalline materials, also on the crystal cut, to dimension waveguides in such a way that they are simultaneously monomodal for one polarization and bimodal for the other, and it achieves this by inserting such a waveguide between two known mode splitter structures, for example those known from reference [4] (FIG. 2(a) and associated description). According to the invention, a polarization filter of the type indicated above is characterized for this purpose by an input section comprising a first, incoming monomodal optical waveguide and a second, incoming monomodal optical waveguide which mutually converge to within their interaction range and which have a difference in propagation constant as a consequence of a mutual first asymmetry, the optical waveguide having the lowest propagation constant forming the input channel, an output section comprising a third, outgoing monomodal optical waveguide and a fourth, outgoing monomodal optical waveguide which mutually diverge until they are outside their interaction range and which have a difference in propagation constant as a consequence of a mutual second asymmetry, the optical waveguide having the lowest propagation constant forming the output channel, and an intermediate optical waveguide, at the input of which the first optical waveguide and second optical waveguide debouch and to the output of which the third optical waveguide and fourth optical waveguide are connected, which intermediate optical waveguide is monomodal for one of the two polarizations and bimodal for the other. If an optical signal containing both the TE and the TM polarization modes in the zero order is injected into the intermediate optical waveguide via the input channel, that is to say optical waveguide having the lowest propagation constant in the input section, first-order modes will be produced for both polarizations. However, since the intermediate optical waveguide is only capable of guiding the first-order mode of one of the two polarizations, the other will escape.

Summary of the advantages:

no fabrication steps are necessary other than those for manufacturing waveguides in the chosen material;

good integrability with other components and no interfering metal elements;

relatively good suppression of the undesired polarization;

none of the parameters, such a length and width of the waveguides and the angles between them, are critical.

REFERENCES

[1] U.S. Pat. No. 4,789,212 entitled: "Integrated optical polarizer with high extension ratio and low insertion loss, and improved method of fabrication thereof";

[2] Y. Suzuki et al.: "Polarization modefilter in GaAs-AlAs superlattice fabricated by $SiO_2$ cap disordering", IEEE Photonics Techn. Lett., vol. 2, No. 11, November 1990, pages 818–819;

[3] Y. Suzuki et al.: "Polarization mode selective waveguides in an InGaAs/InP disordered superlattice", Appl. Phys. Lett., vol. 26, No. 57, Dec. 24, 1990, pages 2745–2747;

[4] W. K. Burns and A. F. Milton, "Mode conversion in planar-dielectric separating waveguides", IEEE J. QUANT. ELECTRO., Vol. QE-11, No. 1, January 1975, pages 32–39;

[5] European Patent Application No. 0 290 061-A entitled: Linear addition polymer with hyperpolarisable side-groups;

[6] European Patent Application No. 0 344 857-A entitled: Electro-optical component and method for making the same and related U.S. Pat. No. 5,016,959.

SHORT DESCRIPTION OF THE DRAWING

The invention will be explained below by reference to a drawing comprising the following figures.

DESCRIPTION OF AN EXEMPLARY EMBODIMENT

Figure 1:
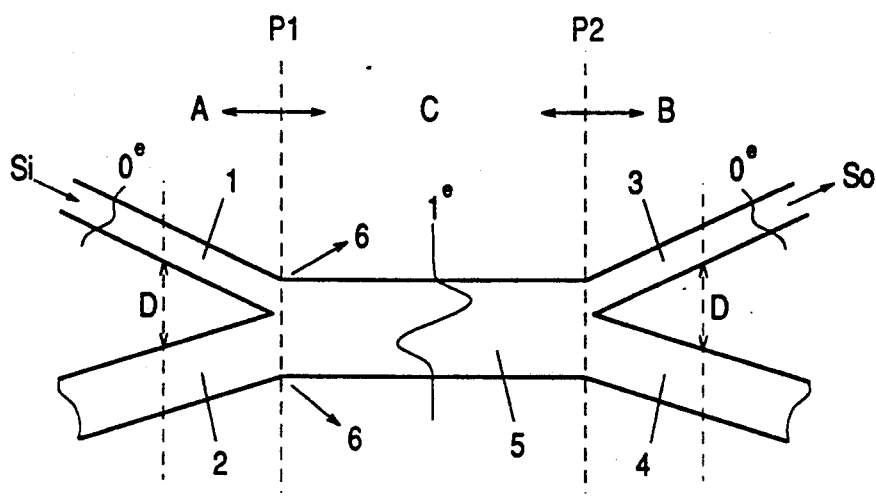
FIG. 1 shows an optical waveguide structure of a polarization filter in accordance with the invention.

The principle of a polarization filter in accordance with the invention is explained in greater detail by reference to FIG. 1. For the sake of convenience, every optical waveguide or optical wave channel to be defined will be denoted by guide or channel, respectively, in the description. This figure presents a diagrammatic plan view of such a filter. It comprises an input section A to the left of a plane p1 perpendicular to the plane of the drawing and indicated by a vertical broken dash line, an output section B to the right of a plane p2 parallel to the plane p1 and also indicated by a vertical broken dash line, and an intermediate section C between the planes p1 and p2. The input section A comprises a first guide 1 and a second guide 2. The guide 1 forms the actual input channel for an optical signal Si containing both polarizations TE and TM, from which one of the two polarizations TE or TM has to be removed. Both guides are dimensioned in such a way that they are monomodal for both the polarizations TE and TM. The guide 2 has a somewhat higher propagation constant than the guide 1, for example as a consequence of a somewhat greater width than the conductor 1. The guides 1 and 2 mutually converge to within their interaction range, where their mutual spacing is less than an interaction distance D. The guide 2 is in fact a dummy guide, which must, however, start at a distance greater than D from the guide 1. Although not necessary, the output section is, for the sake of simplicity and preferably, the mirror image of the input section B. The output section B therefore comprises a third guide 3 and a fourth guide 4, again both monomodal, the guides 3 and 4 having, respectively, the same dimensions and optical properties as the guides 1 and 2, and guide 3 forming the actual output channel for an outgoing optical signal So. The intermediate section C comprises a single guide section into which, on the one hand, the guides 1 and 2 of the input section debouch in the plane p1 and to which, on the other hand, the guides 3 and 4 of the output section are connected in the plane p2. The guide section 5 has dimensions and optical properties which are such that it is monomodal for one of the polarizations TE or TM present in the input signal Si and bimodal for the other polarization therein, that is to say for TM or TE. The fact that such a waveguide section can be produced will be explained below for some materials widely used in integrated optics.

The polarization filter operates as follows. An optical signal Si incoming via the input channel 1 and containing both the TE and TM polarization propagates in said channel for both polarizations in the zero-order guided mode ($0^e$). On arriving in the vicinity of the plane p1, said zero-order modes will be virtually completely converted into first-order modes ($1^e$) for both polarizations within the interaction distance D as the result of the presence of the dummy channel 2. Since the waveguide section 5 guides only one of the two first-order modes, the light of the other polarization will escape from the guide section 5, indicated in the figure by arrows 6. The first-order mode actually guided then reaches the output section in the plane p2. Said output section acts as a mode splitter and specifically, in such a way that a zero-order mode arriving in the plane p2 propagates in the guide 4 having the highest propagation constant and the first-order mode propagates in the guide 3 having the lowest propagation constant. The guided first-order mode in the guide section 5 will therefore be virtually completely converted into a zero-order guided mode in the output channel 3, with the same polarization as the signal guided by the guide section 5 has. This means that, viewed theoretically, a TM or a TE polarization filter can be produced as required through the choice of the guiding properties of the guide section 5. This has to be investigated, however, in practice for every material on which such a filter has to be manufactured in integrated form. It will therefore be indicated below if such filters can be produced, and if so which, for some materials widely used for integrated optical components, viz. the category comprising III-V semiconductors such as InP, the category comprising crystalline substances such as LiNbO$_3$, and the category comprising polable glassy polymers.

It is further pointed out that if the TE polarization is not completely converted into the first-order mode as a result of inaccuracies in the structure at the input section but, for example, 1% continues to propagate in the guide section 5, the splitting action at the output section B ensures that again only 1% thereof will propagate in the output channel 3. In total only 0.01% of the part of the power of the signal Si having the TE polarization will therefore be present in the output signal So, which corresponds to a suppression of 40 dB.

Instead of being symmetrical, in which case the output section is therefore the mirror image of the input section, the filter structure may also be antisymmetrical, in which case the output signal is the rotated mirror image of the input signal. The principle of the polarization filter in accordance with the invention permits the light path via the guides 2, 5 and 4 to be used to guide any desired optical signal in any of the two direction without the filter action being disturbed, and even without said desired signal being disturbed. In the antisymmetrical case a 'level' of the light paths can thereby be achieved without mutual influencing of the signals.

The principle of the polarization filter having a structure as shown in FIG. 1 is based on the observation that, in channel-type guides, the two polarizations may have a different degree of confinement. This is explained below by reference to three examples.

EXAMPLE 1

Figure 2A:
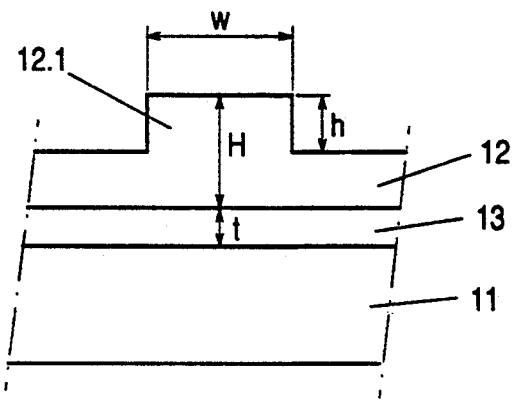
FIG. 2(a) shows a cross section of a rib-type optical waveguide based on InP.
Figure 2B:
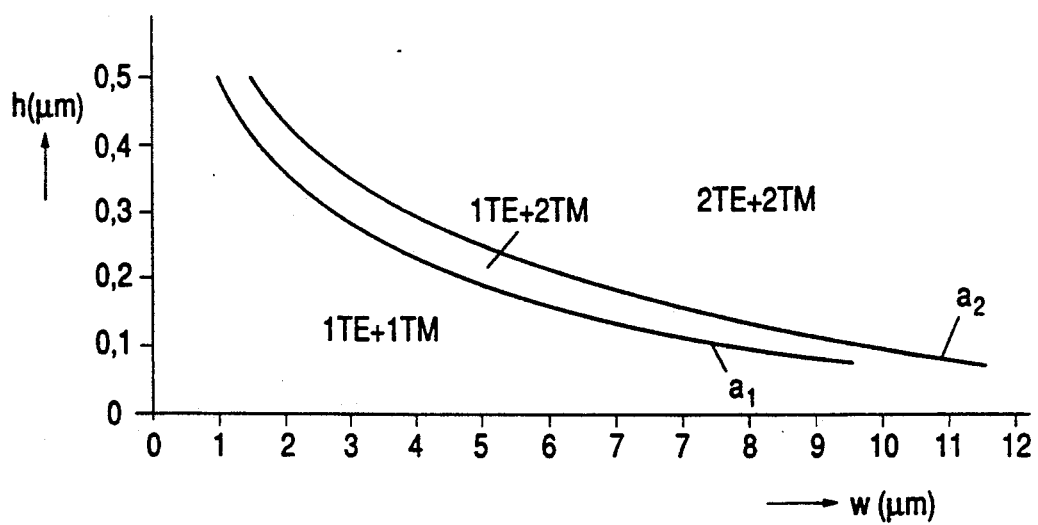
FIG. 2(b) shows a contour diagram for waveguides having a cross section in accordance with FIG. 2(a)

FIG. 2(b) shows a contour diagram for a rib-type guide based on InP, a cross section of which is shown in FIG. 2(a). Situated between a substrate 11 and an upper layer 12, both composed of InP, is a light guiding layer 13, the so-called quaternary layer, composed of InGaAsP and having thickness t. The upper layer 12 has, locally over the length of the guide, a rib-type elevation 12.1 having a height h and a width w which is obtained, for example, by partially etching away after starting with an upper layer having an original thickness H. With suitable choice of the dimensions (h, H, w, and t), such an elevation 12.1 is known to produce a lateral boundary for a light wave propagating in the light-guiding layer, with the result that a light-guiding channel is produced. Starting from a suitably chosen thickness t of the layer 13 and the original thickness H of the upper layer 12, variation in the height h and the width w is found to yield light-guiding channels which are monomodal, bimodal, trimodal, etc., i.e. suitable for no guiding, respectively, one, two, three, etc. guided modes of an optical signal having a given wavelength. Whether an optical channel is mono-, bi- or trimodal, etc. for a given height and width is furthermore also dependent, however, on the polarization of the guided modes. The contour diagram in FIG. 2(a) shows transition lines $a_1$ and $a_2$ as a function of the width w (horizontal axis, in $\mu$m) and the height h (vertical axis, in $\mu$m). Every point in the (w, h) plane represents a light channel whose dimensions correspond to the coordinates of said point. Transition line $a_1$ means that any point to the left of it represents an optical channel which is monomodal for both the TE and the TM polarization, that is to say only guides the zero order mode of both polarizations. This region is denoted by 1TE+1TM. Every point to the right thereof, but to the left of the transition line $a_2$, represents an optical channel which is still monomodal for the TE polarization, but bimodal for the TM polarization, that is to say it guides only the zero-order mode of the TE polarization but both the zero-order and the first-order mode of the TM polarization. This region is denoted by 1TE+2TM. Points in the region next thereto and to the right of the transition line $a_2$ represent optical channels which are bimodal, trimodal and multimodal for both polarizations and are denoted by 2TE+2TM. Such regions can also be specified for higher order guided modes but these are no longer relevant to the present invention. The points with which the transition lines $a_1$ and $a_2$ were determined have been calculated with the aid of the effective-index method, known per se, for the following values: wavelength of the light 1.5 $\mu$m, thickness t=0.473 $\mu$m, height H=0.504 $\mu$m, refractive index of InP=3.1753, refractive index of InGaAsP=3.4116.

From the diagram in FIG. 2(b) it can be inferred that rib-type guides can be produced which are monomodal for the TE polarization but bimodal for the TM polarization. This means that a TM polarization filter based on InP is possible. From simulations it has emerged that very good input and output sections A and B can be produced with rib-type guides for which h=0.2 $\mu$m and w=2.0 $\mu$m for the guides 1 and 3 and w=3.9 $\mu$m for the dummy guides 2 and 4, with a convergence angle or splitting angle, respectively, of 0.5 degrees, with less than 1% of the incoming optical signal Si being in the undesired mode. The convergence of the guides 1 and 2 in the input section A produces the guide section 5 having a width which is somewhat less than 6 $\mu$m. From FIG. 2(a) it can be inferred that, for that width, the guide section 5 is bimodal for the TM polarization and monomodal for the TE polarization and therefore has the property necessary for a TM polarization filter according to the invention, namely that it does not guide the first-order mode of the TE polarization, but does guide the TM polarization. From a simulation it has emerged that a TM polarization filter is possible which has 40 dB suppression of the TE polarization with a component length of <1 mm. For 60 dB suppression, the component length can be limited to 1.5 mm.

EXAMPLE 2

Figure 3:
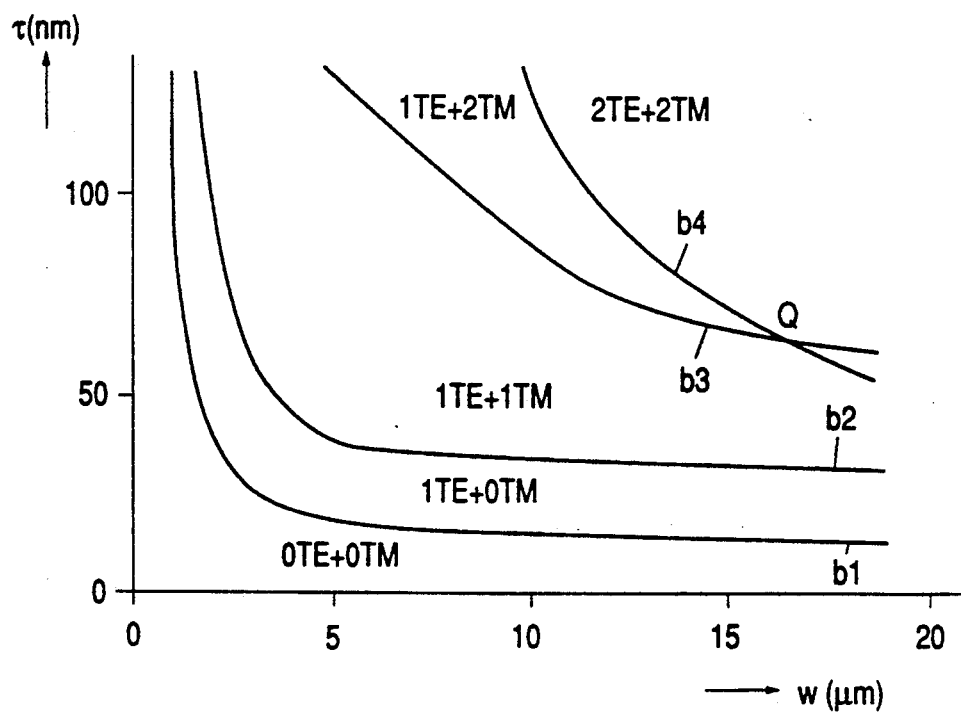
FIG. 3 shows a contour diagram for diffused optical waveguides based on Z-cut lithium niobate.

Channel-type guides, inter alia, are produced in lithium niobate by diffusing a titanium strip having a thickness $\tau$ and a width w into a substrate of this material. The increase in a refractive index which arises as a result thereof is dependent on the polarization of the optical signal to be guided. For an optical signal which is polarized along the optical axis of the crystal (normally referred to as Z-axis) the extraordinary refractive index $n_e$ is operative, whereas the ordinary refractive index is operative for light polarised perpendicularly thereto. The associated increases in these refractive indices as a consequence of the presence of the diffused titanium can vary appreciably. FIG. 3 shows a contour diagram for such diffused guides which is similar to that of FIG. 2(b), but in this case for the dimensions of the titanium strip (w, $\tau$) diffused into a Z-cut lithium niobate substrate. Transition lines $b_1$, $b_2$, $b_3$ and $b_4$ similar to those in FIG. 2(b) are shown as a function of the width (horizontal axis, in $\mu$m) and the thickness $\tau$ (vertical axis, nm). Here again, the points with which the transition lines were determined have been calculated with the aid of the effective-index method, and specifically, with the following values: wavelength of the light 1.55 $\mu$m, ordinary refractive index of LiNbO$_3$ $n_o$=2.2111, extraordinary refractive index of LiNbO$_3$ $n_e$=2.1380; diffusion process conditions: temperature 1000° C., time 16 hours. The regions of which the transition lines form the boundaries are indicated by iTE+jTM, where i, j=0, 1 or 2. The points in the region denoted by 1TE+2TM between the transition lines $b_3$ and $b_4$ represent suitable values for a waveguide which is monomodal for the TE polarization and bimodal for the TM polarization. From the diagram in FIG. 3 it can be inferred that suitable dimensions for a TM polarization filter are thickness $\tau$=100 nm, width w=4 $\mu$m for the guides 1 and 3, width w=6 $\mu$m for the dummy guides 2 and 4 and the width w=approximately 10 $\mu$m for the intermediate guide section, while, in this case, the convergence angle of the guides 1 and 2 may be approximately 0.2 degree. A notable feature is that the transition lines $b_3$ and $b_4$ have a point of intersection Q at w=approximately 16 $\mu$m. Beyond said point of intersection Q there is a 2TM+1TM region between said transition lines. The points in this region represent dimensions of guides which are monomodal for the TM polarization and bimodal for the TE polarization, which would therefore be suitable for producing a TE polarization filter, but one with an unusably or unmanageably large width. Another notable point is that it can inferred from the diagram that, for certain dimensions of the diffused titanium strip, lateral confinement is still not obtained for an optical signal in the planar lithium niobate guide. These dimensions are represented by the points of the region 0TE+0TM to the left of, and beneath, the transition line $b_1$. Situated between the transition lines $b_1$ and $b_2$ is the region 1TE+0TM having points which represent dimensions of guides which are only capable of guiding the zero-order mode of the TE polarization. In principle, this makes it possible to produce a still simpler TE polarizer in which both the input section and the output section B having the splitter function can be omitted. In practice, this will, however, present difficulties since this region is relatively narrow, as a result of which the guided mode remains too close to the cut-off condition and therefore undergoes a high propagation attenuation. For conductors diffused into X-cut lithium niobate with propagation along the Y-axis (or Y-cut with X-propagation) virtually the same contour diagram applies, in which, however, the role of the TE and the TM polarizations are interchanged. This means that present therein is a 1TM+2TE region comprising points representing guides which are monomodal for the TM polarization and bimodal for the TE polarization, with the result that a TE polarization filter can be produced with such an X-cut (or Y-cut).

EXAMPLE 3

Figure 4A:
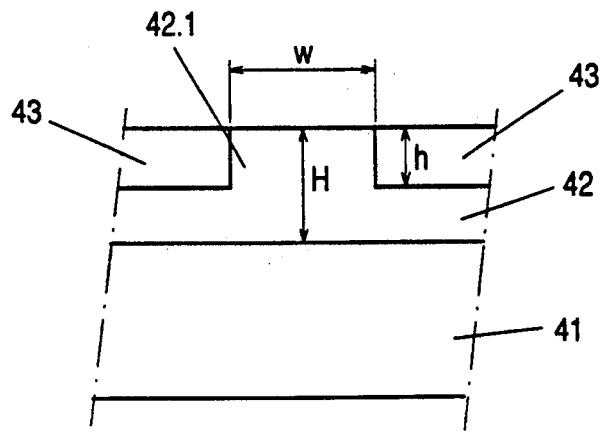
FIG. 4(a) shows a cross section of a rib-type optical waveguide based on a polable polymer.
Figure 4B:
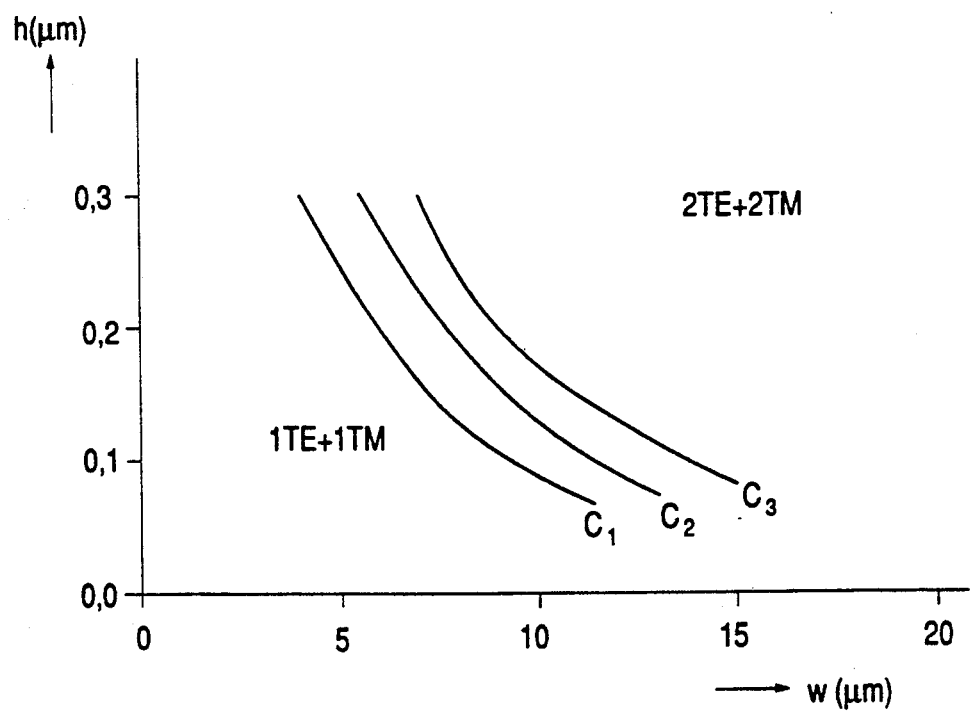
FIG. 4(b) shows a contour diagram for optical waveguides having a cross section in accordance with FIG. 4(a).

Other common materials are of the polable glassy polymer type, such as are disclosed, for example, by references [5] and [6]. Channel-type guides can easily be provided in a layer of such a polymer using known techniques, for example the UV-light irradiation technique disclosed by reference [6]. FIG. 4(a) shows the cross section of a rib-type conductor based on such a polymer. Provided on a substrate 41 made of glass having a refractive index of 1.54 is a planar light-guiding layer 42 of polable glassy polymer having a thickness of H=1.2 μm. In the unpoled state, the chosen polymer has a refractive index of 1.595; and in the poled state, the refractive index is 0.02 higher for the TM polarization and 0.01 lower for the TE polarization. A rib-type spine 42.1 having a height h and width w has been formed in the layer 42 by selective irradiation with UV light. The irradiated sections 43 have a refractive index of 1.565. A contour diagram similar to that of FIG. 2(b) for light having a wavelength of 1.319 μm is shown for such a guide in FIG. 4(b). If the polymer in the layer 42 is unpoled, there is found to be no, or virtually no, difference in lateral confinement for the two polarizations in a rib-type guide having any dimension whatsoever, and therefore it is not possible to construct any guides of this type which are simultaneously monomodal for one polarization and bimodal for the other. In the diagram this is manifested by the fact that there is then only one transition line $c_1$ present in the (w, h) plane between the regions 1TE+1TM and 2TE+2TM. If the material is poled, the single transition line $c_1$ is replaced by two transition lines $c_2$ and $c_3$. There are two possibilities. If the material is poled in a direction perpendicular to the substrate, the region between the transition lines $c_2$ and $c_3$ is a 1TE+2TM region and the points between the two transition lines represent guides which are monomodal for the TE polarization and bimodal for the TM polarization, with the result that TM polarization filters can be produced for this poling direction. However, if the material is poled in a direction parallel to the substrate but perpendicular, in fact, to the direction of the guide, the role of the polarizations is again interchanged and the region is a 1TM+2TE region. TE polarization filters can be produced with such a poling. Just as in the case of lithium niobate, it is therefore possible to produce both types of polarization filters.

I claim:

1. A polarization filter for filtering an optical signal entering via a monomodal input channel and containing both the TE and the TM polarization modes to produce an optical signal emerging via a monomodal output channel and exclusively containing, at least essentially, one of said two polarization modes, the polarization filter comprising
   an input section including a first incoming monomodal optical waveguide and a second incoming monomodal optical waveguide which mutually converge to within their interaction range and have a difference in propagation constant as a consequence of a mutual first asymmetry,
   an output section including a third, outgoing monomodal optical waveguide, and
   an intermediate optical waveguide, at the input of which the first optical waveguide and second optical waveguide debouch and at the output end of which the third optical waveguide is connected, characterized in that
   the intermediate optical waveguide is monomodal for one of said polarizations and bimodal for the other,
   said mutual first asymmetry between the first and second waveguide is of the same sign for both of the polarization modes, the optical waveguide having the lowest propagation constant forming said monomodal input channel, and
   the output section includes a fourth, outgoing monomodal optical waveguide which is connected at said output end of said intermediate optical waveguide and which mutually diverges from said third waveguide at least to a location outside the interaction range of said third and fourth waveguides, said third and fourth waveguides having a difference in propagation constant as a consequence of a mutual second asymmetry, which is of the same sign for both of the polarization modes, the optical waveguide having the lower propagation constant forming said monomodal output channel.

2. The polarization filter according to claim 1, characterized in that the waveguides are of the 'rib' type, each having an equal height and an individually predetermined width.

3. The polarization filter according to claim 1, characterized in that the output section is the mirror image of the input section.

4. The polarization filter according to claim 1, characterized in that the output section is the rotated mirror image of the input section.

5. The polarization filter according to claim 2, characterized in that the output section is the mirror image of the input section.

6. The polarization filter according to claim 2, characterized in that the output section is the rotated mirror image of the input section.

* * * * *